United States Patent [19]

Williams et al.

[11] Patent Number: 4,532,407
[45] Date of Patent: Jul. 30, 1985

[54] WELDING APPARATUS

[75] Inventors: Dean T. Williams, Canton; Charles E. Swiney, Hartland, both of Mich.

[73] Assignee: Weld Mold Company, Brighton, Mich.

[21] Appl. No.: 558,491

[22] Filed: Dec. 6, 1983

[51] Int. Cl.$^3$ .............................................. B23K 37/02
[52] U.S. Cl. .................................... 219/125.1; 219/138
[58] Field of Search ................. 219/125.1, 136, 137.2, 219/137.31, 137.7, 138, 139, 70; 901/14, 15, 42

[56] References Cited

U.S. PATENT DOCUMENTS

| | | | |
|---|---|---|---|
| 2,818,494 | 12/1957 | Bernard et al. | 219/125.1 X |
| 3,046,387 | 7/1962 | Kiilunen | 219/125.1 |
| 4,221,953 | 9/1980 | Kiilunen | 219/125.1 |
| 4,448,342 | 5/1984 | Abe et al. | 219/125.1 X |

Primary Examiner—Roy N. Envall, Jr.
Assistant Examiner—Catherine M. Sigda
Attorney, Agent, or Firm—Bertram F. Claeboe

[57] ABSTRACT

Welding apparatus embodies an electrode support and guide structure provided by a framework hingedly connected at opposite ends and supported generally midway of the ends by a swivel joint assembly rotatively mounted for swingable movement by one end of a hinged support arm connected at its opposite end to generally vertically disposed mounting structure. A plurality of pivotal connections are provided which permit an operator to move the electrode vertically, horizontally, and generally arcuately with respect to a workpiece being welded.

5 Claims, 4 Drawing Figures

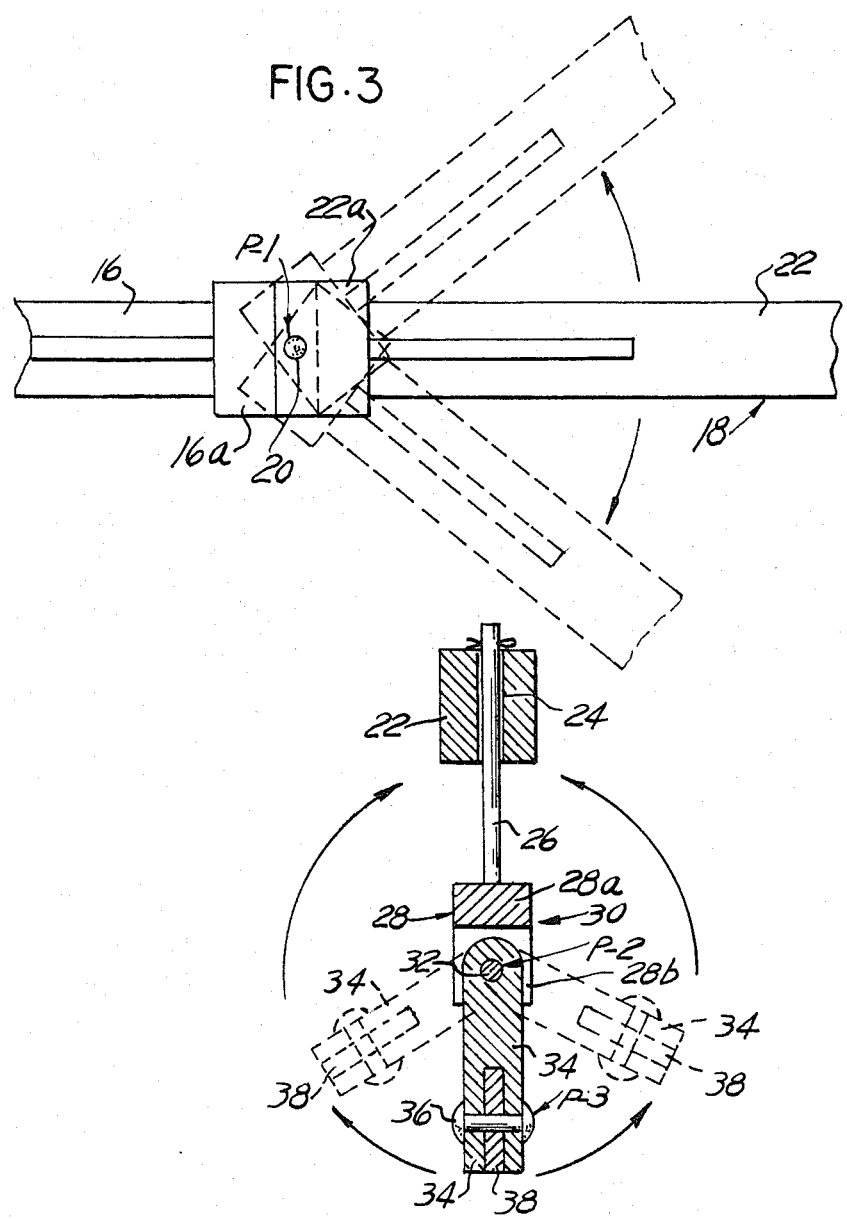

WELDING APPARATUS

BACKGROUND OF THE INVENTION

In the gas metal arc welding (GMAW) process, also often referred to as the metal inert gas (MIG) method, it is known in the art to provide manually operable arms for holding and guiding the welding electrode. These devices not only permit accurate control by the operator of the welding procedure, but also permit him to be stationed a distance from the welding site sufficient to avoid excessive heat, but also associated arcing and sputtering of flying metal. These objectives have generally been attained by equipment of the character disclosed in U.S. Pat. No. 4,221,953, granted Sept. 9, 1980 in the name of John P. Kiilunen, and which is assigned to the assignee of the instant patent application.

While the welding electrode and guide means shown in the mentioned patent represents a substantial advance over the equipment disclosed in U.S. Pat. No. 3,046,387 issued July 24, 1962 in the name of Matt Kiilunen, and which is referred to in the later issued patent, it can be seen that in the latter patent the frame section 11 is mounted upon a central pivot defined by the vertical post 16. This requires substantial fast movement by the operator in order to properly position the electrode 12 with respect to the workpiece W during the total welding operation. Releated to this problem is the fact that the operator while welding is spaced from his work the length of the frame section 11, and thus does not have the necessary "feel" for the task which he is performing. Additionally, while horizontal and vertical travel of the electrode are provided in U.S. Pat. No. 4,221,953, as shown in FIGS. 1 and 2 thereof, arcuate or semi-spherical movement of the electrode cannot with facility be accomplished by the patented structure disclosed.

SUMMARY OF THE INVENTION

It has been discovered by applicants that substantially increased mobility is imparted to the welding operation by provision of a simplified frame structure centrally pivotally connected by a novel swivel joint arrangement rotatably supported at one end of a swingable arm hingedly connected to a generally upright post member or like support means. By provision of welding apparatus of this character the welder is more proximate the work piece, the electrode position is controllable by the operator vertically, horizontally and arcuately, and during performance of the welding task the operator's foot position can remain relatively unchanged.

BRIEF DESCRIPTION OF THE DRAWINGS

FIG. 3 is a fragmentary horizontal sectional view taken substantially along the line 3—3 of FIG. 2, and portraying by phantom lines horizontal swingable movement of the electrode support frame structure; and FIG. 4 is a vertical sectional sectional view taken substantially along the line 4—4 of FIG. 2, and showing by arrows the arcuate or semi-spherical movement of the electrode support means provided by the novel joint arrangement of this invention.

DESCRIPTION OF THE PREFERRED EMBODIMENT

Figure 1:
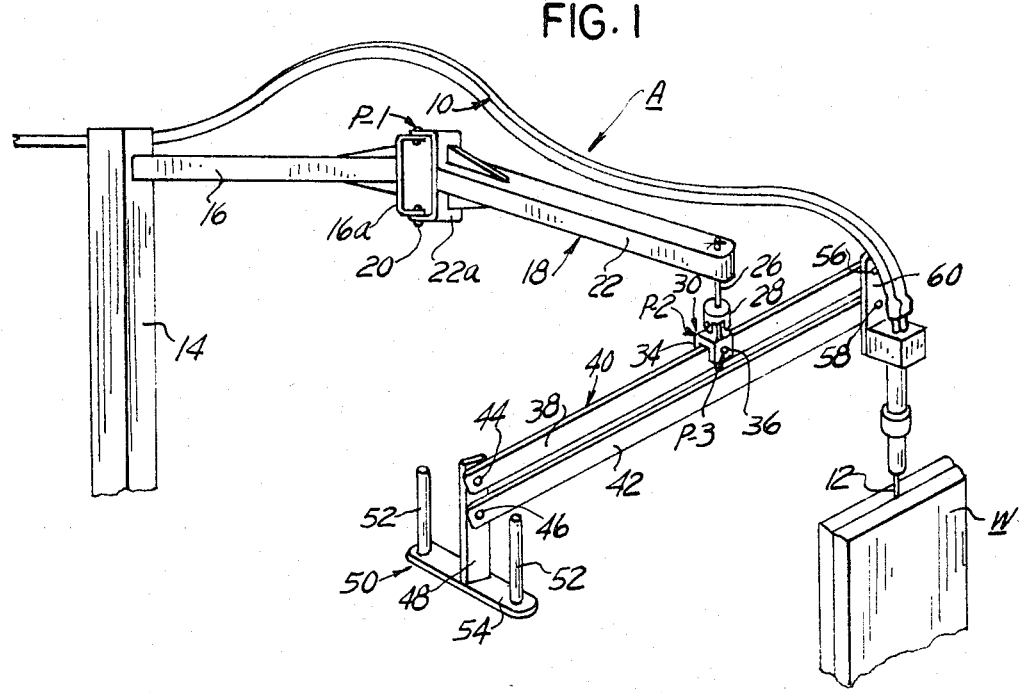
FIG. 1 is a side perspective view of welding apparatus constructed in accordance with the novel concepts of this invention.

Referring now first to FIG. 1 of the drawings, welding apparatus embodying the novel features of the instant invention is designated generally therein by the legend A. The apparatus is well suited by use in the gas metal arc welding (GMAW) or metal inert gas (MIG) process well-known in the welding art, and includes cable means 10 for supplying power, shielding gas, circulating water and wire to electrode 12. The wire may be flux-cored or solid welding wire, and the shielding gas may be argon or helium which are inert to the products of the weld zone.

Welding apparatus A may be supported in any suitable manner, and in the illustrative embodiment shown there is provided a vertically disposed standard or post 14 fixedly mounting support arm 16 of supporting frame generally designated as 18. The fixed support arm 16 is provided with a generally U-shaped hinge section 16a connecting through pin means or the like 20 with generally U-shaped hinge section 22a forming a part of swingable support arm 22 of the supporting framework 18. By provision of a framework 18 constructed as shown and described, wherein support arm 22 is swingable through a wide arc about fixed pivot P-1 provided by the hinge sections 16a and 22a connected by pin means 20, substantial mobility is imparted to welding apparatus A, as will be more fully appreciated when detailed reference is later made to FIG. 3 of the drawings. Effectively, the hinge sections 16a and 22a and pin means 20 provide the main swingable hinge support means for other novel structure of this invention.

The distant end of swingable support arm 22 is passaged to receive therein bearing means 24 journalling shaft means 26 supporting clevis member 28 of joint assembly generally designated at 30. The clevis member 28 is shaped to include a generally cylindrical head portion 28a and a skirt portion 28b passaged to receive pin means 32 providing a swingable connection with upstanding tongue portion 34a on bracket number 34. It is to be now noted, although more specific reference will later be made in connection with FIG. 4, swivel joint assembly 30 by its novel structure provides a second pivot, P-2, for welding apparatus A.

Bracket member 34 of joint assembly 30 makes connection through pin means or the like 36 with upper frame member 38 of frame assembly 40 substantially midway of the length thereof. Frame assembly 40 further includes lower frame member 42, which substantially corresponds with upper member 38, and both of said members 38 and 42 at one end thereof are pivotally connected at 44 and 46, respectively, to upstanding member 48 of control assembly 50 equipped with a pair of spaced hand grips or like means 52 mounted upon base plate 54 in the illustrative embodiment shown. Opposite ends of frame members 38 and 42 by provision of pin means or the like 56 and 58 are connected to bracket member 60 supporting the welding electrode 12 shown in operable position relative to an exemplary workpiece W.

Figure 2:
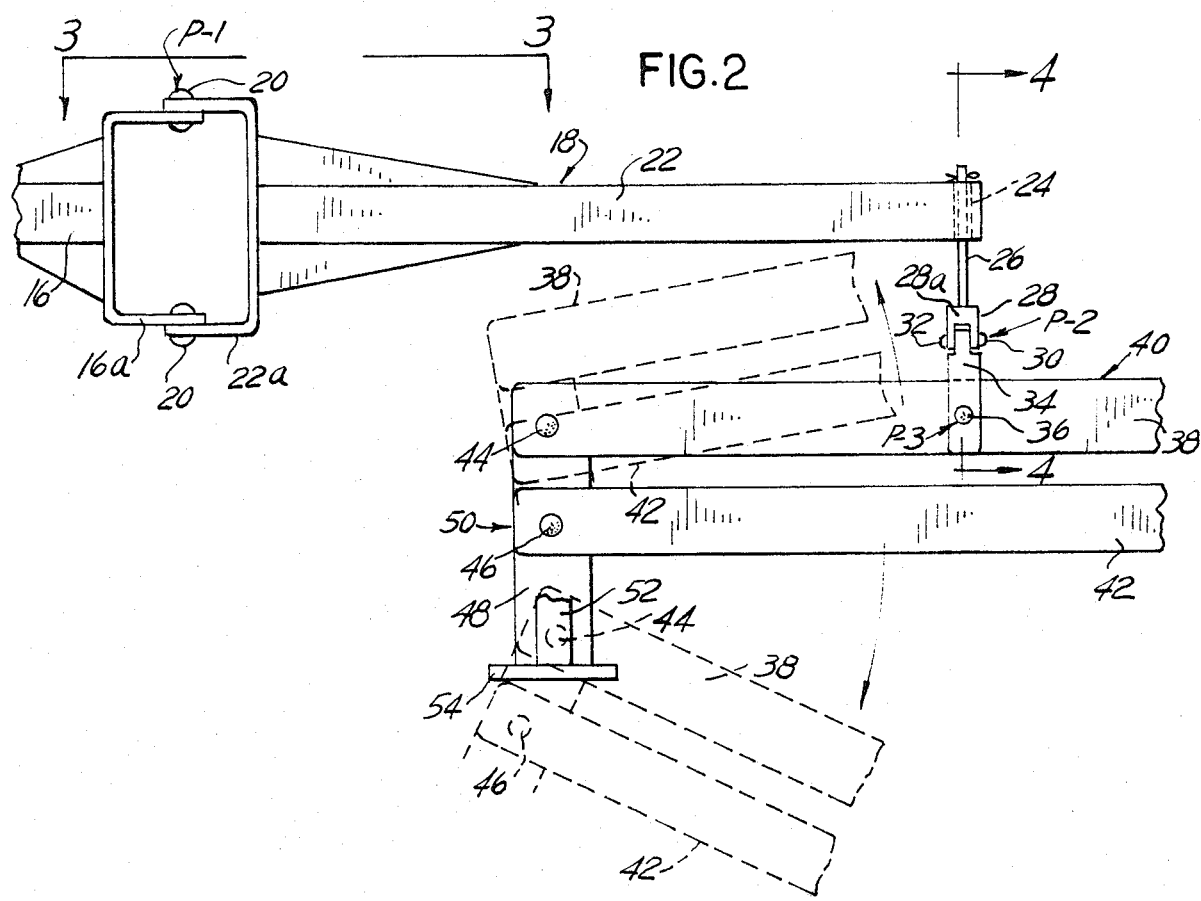
FIG. 2 is a fragmentary side elevational view of the plural pivot arrangement herein provided, and showing by phantom lines various vertical positions of the electrode-supporting frame structure.

The novel movement in vertical direction or plane to raise or lower electrode 12 with respect to workpiece W is believed now manifest from the description of the preceding paragraph, particularly when considered in connection with FIGS. 1 and 2.

The central pivot point P-3 in this action is about pin means 36 connecting bracket member 34 of joint assembly 30 to upper frame member 38 of frame assembly 40. This in turn initiates pivotal action about pin means 44, 46, 56 and 58 to move the frame members 38 and 42 from the solid line position of FIG. 2 to either of the typical phantom line positions shown therein.

This of course assumes that the electrode 12 has already been located in proximity to workpiece W, accomplished by means of hand grips or like means 52, causing essentially simultaneous rotation of shaft member 26 in bearing means 24 seated in support arm 22, and swingable movement of the arm 22 about pivot point P-1, as is further shown by phantom lines in FIG. 3. It can now be readily appreciated that the welder or operator with his hands on the grips 52 of the control assembly 50 may remain in an essentially stationary position and can move the electrode 12 along an almost limitless path of horizontal travel from his location generally between the vertical support 14 and workpiece W. Yet, at the same time, the operator is in close proximity to the workpiece W during welding so that it is visible at all times and he has the desired "feel" for the work as he is welding, but nevertheless is not significantly exposed to excessive heat, associated arcing, and possible sputtering of flying metal.

Arcuate movement of the electrode 12 in a vertical plane is a significant advance made by the instant invention, and particular reference is now made to FIGS. 1 and 4. To accomplish this, an operator positioned proximate the control assembly 50 and with his hands grasping the grips 52, needs only to exert a twisting or rotative action to cause bracket member 34 connected to frame assembly 40 to pivot about point P-2 provided by pin means 32 of swivel joint assembly 30. The extent of this movement is portrayed in FIG. 4, and it may be seen to traverse an arc approaching 180° in opposite clockwise and counterclockwise directions about pivot point P-2.

It is believed now apparent that applicants have provided welding apparatus which features a degree of mobility not achieved by prior art structures. By ready manipulation of a novel arrangement of a minimum number of parts an operator in an essentially stationary position can easily direct the electrode head vertically, horizontally and arcuately, and can thereby readily weld workpieces of a wide variety of sizes and shapes having contours and configurations not accessible by prior art mechanisms. By the novel structure herein disclosed the workpiece is at all times visible to the operator so that he has the requisite "feel" therefor, and yet the operator is safely positioned so as to avoid possible exposure to excessive heat, arcing and metal spattering.

Various changes and modifications may of course be effected in the structures disclosed herein without departing from the spirit of the invention or the scope of the subjoined claims.

We claim:

1. A welding electrode support and guide structure for use in closely adjacent hand manipulable welding operations, comprising a generally vertically disposed mounting member, a support arm member connected to said mounting member and swingable with respect thereto in a substantially horizontal plane, a swivel joint assembly carried by said support arm member adjacent one end thereof, a hingedly connected framework mounted generally intermediate of its opposite ends by said swivel joint assembly, and means at one end of said framework for actuating said swivel joint assembly and said swingable support arm member to move an electrode carried at the opposite end of said framework in generally horizontal, vertical and arcuate planes with respect to a workpiece being welded.

2. A welding electrode support and guide structure as defined in claim 1, in which the swivel joint assembly includes shaft means journalled for rotation in said one end of said support arm member to effect generally horizontal movement of the electrode relative to a workpiece being welded.

3. A welding electrode support and guide structure as defined in claim 1, in which the swivel joint assembly includes a clevis member and in which the mounting of said framework by said joint assembly includes a yoke member pivotally connected to said clevis member, whereby when motion is imparted to said means at one end of said framework in a particular direction said yoke member is pivoted relative to said clevis member and the electrode is caused to rotate in a generally arcuate plane with respect to a workpiece being welded.

4. A welding electrode support and guide structure as defined in claim 1, in which the support arm member comprises a first portion rigidly connected at one end to the generally vertically disposed mounting member and a second portion connected at one end to the opposite end of said first portion, in which there is provided hinge means connecting the opposite end of said first arm support portion to the one end of said second arm support portion, and in which said swivel joint assembly is carried by the opposite end of said second arm portion, whereby when said second arm portion is actuated about the pivot provided by said hinge means the electrode is caused to move in a substantially horizontal plane relative to a workpiece being welded.

5. A welding electrode support and guide structure as defined in claim 1, in which the framework comprises spaced upper and lower elongated frame members in which there is provided first and second pivot means at opposite ends of said frame members for connecting the same and for movement in unison, in which the swivel joint assembly is pivotally connected to said upper frame member generally intermediate its opposite ends, and in which the actuating means is connected to said first pivot means and the electrode is connected to said second pivot means, whereby the actuating means is utilized the upper and lower frame members move in a generally vertical plane in unison upon said first and second pivot means and upon the pivot connection between said upper frame member and said swivel joint assembly to raise or lower the electrode with respect to a workpiece being welded.

* * * * *